(No Model.)

2 Sheets—Sheet 1.

G. F. BROWN.
WASTE TRAP.

No. 477,499.

Patented June 21, 1892.

Witnesses:
Fred D. Godwin.
A. V. Groupe.

Inventor:
George F. Brown
by his Attorneys
Howson & Howson (No Model.) 2 Sheets—Sheet 2.
G. F. BROWN.
WASTE TRAP.
No. 477,499. Patented June 21, 1892.
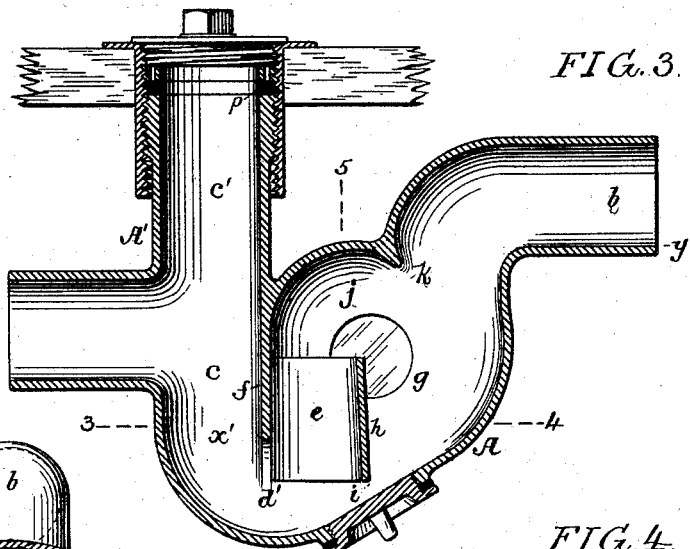
FIG. 3.
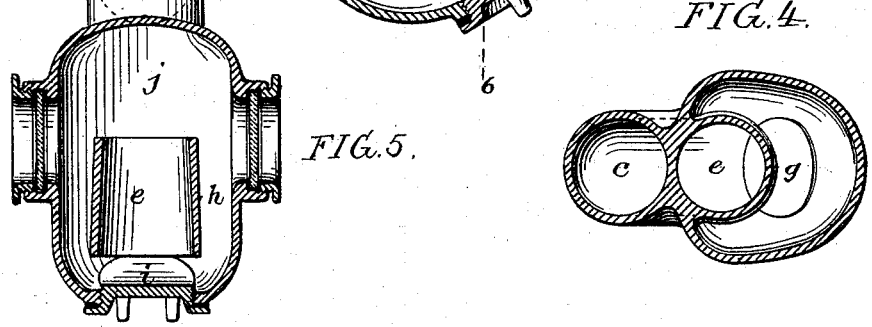
FIG. 4.
FIG. 5.
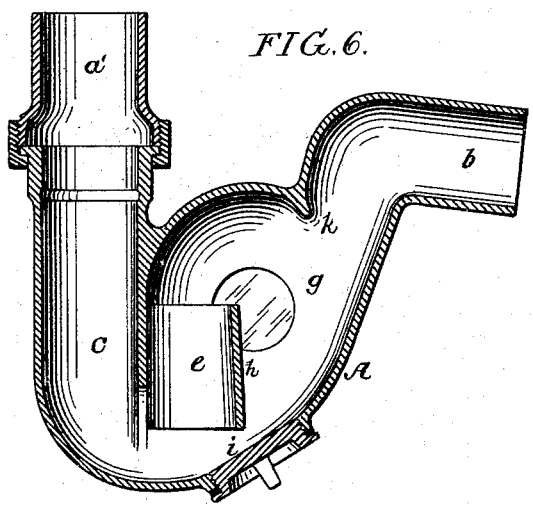
FIG. 6.
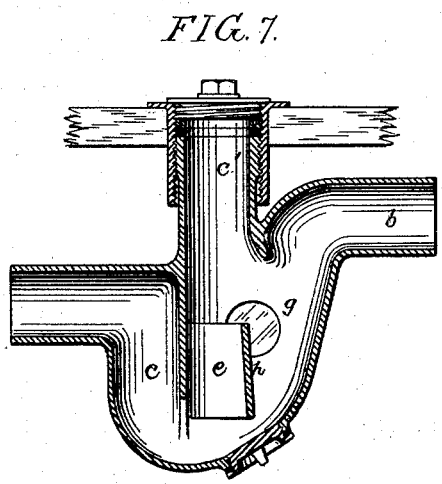
FIG. 7.
Witnesses:
Fred L. Goodwin.
A. V. Groupe.
Inventor:
George F. Brown
by his Attorneys
Howson & Howson

UNITED STATES PATENT OFFICE.

GEORGE F. BROWN, OF PHILADELPHIA, PENNSYLVANIA.

WASTE-TRAP.

SPECIFICATION forming part of Letters Patent No. 477,499, dated June 21, 1892.

Application filed July 7, 1891. Serial No. 398,734. (No model.)

*To all whom it may concern:*

Be it known that I, GEORGE F. BROWN, a citizen of the United States, and a resident of Philadelphia, Pennsylvania, have invented certain Improvements in Waste-Traps, of which the following is a specification.

The object of my invention is to so construct a trap to be placed in the waste-passage from a wash-basin, sink, or bath-tub that it will be proof against siphonage under the ordinary circumstances and which will be scoured by the water passing through it.

A further object of my invention is to so construct the trap that it can be adjusted to the floor when set thereunder, as fully described hereinafter, reference being had to the accompanying drawings, in which—

Figure 1:
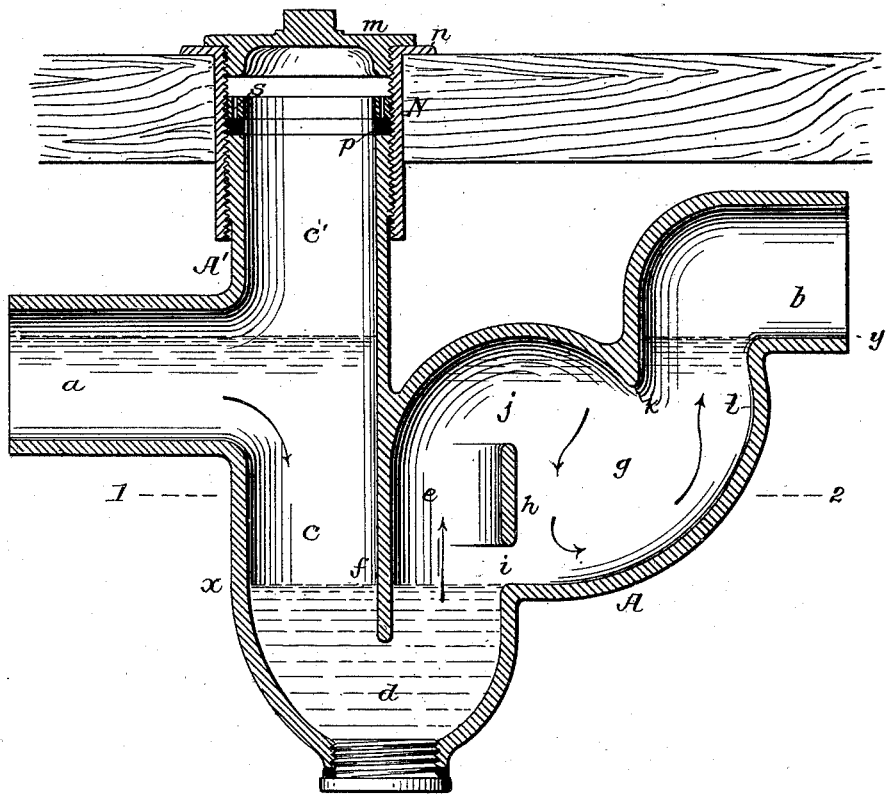
Figure 2:
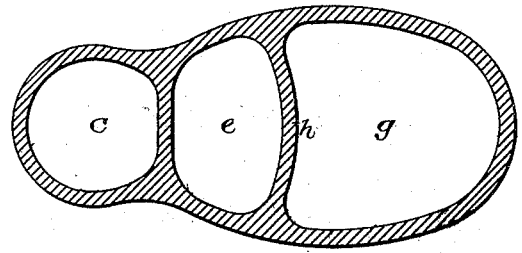

Figure 1 is a vertical section of my improved trap, showing it mounted under a floor. Fig. 2 is a sectional plan on the line 1 2, Fig. 1. Fig. 3 is a vertical section illustrating a modification of my invention. Fig. 4 is a sectional plan on the line 3 4, Fig. 3. Fig. 5 is a transverse section on the line 5 6, Fig. 3. Figs. 6 and 7 are views showing slightly-different forms of traps embodying my invention.

I would state in the outset that traps for basins and sinks are generally mounted directly under the basin or sink and above the floor and that the bath-tub traps are generally mounted under the floor and have an inspection-opening above the level of the floor, although in some instances the basins and sink-traps may also be placed below the floor where it is not desirable to expose them to view.

Referring in the first instance to Figs. 1 and 2, A is the body of the trap, preferably formed of one piece, either metal or pottery or other suitable material, having an inlet-opening $a$ and an outlet-opening $b$.

$c$ is a vertical passage, which is virtually a continuation of the inlet-opening $a$.

$d$ is a cup in the base of the trap A, with which communicates the passage $c$. Also communicating with this cup is a passage $e$, separated from the passage $c$ by a partition $f$, which extends below the water-line $x$ of the cup, forming a water seal, so that gases cannot escape from the passage $e$ into the passage $c$ to the inlet-passage. I would state here that the water cannot fall below the water-line $x$ no matter how severe the siphoning action at the discharge end of the trap would be, as the body of water in the cup could not be lifted to the discharge-outlet $b$ before air would be admitted through the inlet-opening, and thus break the siphon, and the water would immediately flow back into the cup to the level $x$, thus sealing the trap.

Beyond the passage $e$ is a receiver $g$, separated from the passage $e$ by a partition $h$, which does not, however, extend to the bottom of the receiver. Thus an opening $i$ is formed at the bottom for the passage of water to and from the receiver $g$. The partition $h$ extends up to the point as shown in the drawings, leaving a passage $j$ for the waste water as it is discharged from the basin or tub. The main body of water in the majority of cases passes up the the passage $e$, over the partition $h$, through the passage $j$, and into the receiver $g$. The water strikes a deflector $k$ in its passage to the receiver $g$, which directs it into the receiver, as shown by the arrows, Fig. 1, so that it will first enter the receiver before passing to the outlet $b$. I preferably extend the deflector down to or below a line $y$, which is the base-line of the outlet-opening, and I curve the outer wall of the receiver inward at $l$ to deflect the water from the receiver to waste from its straight course. The normal water-line of the trap is the line $y$, although if a number of traps are connected with the same outlet-passage the operation of these traps will tend to siphon the water from the trap, so that the water-line will change, being always between the two lines $x$ and $y$; but owing to the small amount of water required to make the seal in the cup $d$ the water will not be drawn off to a point below the line $x$, as described above, but as soon as water is admitted to the trap through the inlet-opening the water will seek the level $y$ and will keep the level unless drawn out by the action of other basins or sinks connected with the outlet-passage. Owing to the large area of the receiver $g$ it will receive sufficient water when suction takes place in the waste to make a good seal, the air when the seal is broken passing generally from the inlet-passages $a$ and $c$ up the passage $e$ and over the partition $h$, the water in the receiver flowing back through the passage $i$. It will be noticed that the walls of the trap are smooth, no corners being formed for the lodgment of dirt, and owing to the shape of the trap the water passes through in such manner as to thoroughly scour and clean it. It will be noticed on referring to Fig. 1 that the passage c extends beyond its junction with the inlet-opening a, forming an inspection or cleaning opening c', closed by a suitable cap m.

As the traps are coupled to the waste-pipes generally before the floor is laid, when mounted under the floor, great care has to be exercised that the flange n will be on a level with the floor-line; but by my improvement I can mount the trap without fitting it accurately to the proposed level of the floor and leave this fitting until the floor is laid, as I make the flange n vertically adjustable in respect to the body of the trap by mounting it on a sleeve N, which has an internal screw-thread adapted to an external screw-thread on the extension A' of the trap, so that by turning this sleeve it can be raised or lowered until its flange is level with the floor. Then I insert a packing p, which is confined between the extension A' and a follower s, which has an external screw-thread adapted to the screw-thread in the sleeve and has holes or lugs adapted to receive an instrument by which it is turned, so that it will force the packing p down onto the extension A', forming a tight joint. The screw-cap n is then screwed into the sleeve N, closing the cleaning-opening. Thus it will be seen that the trap can be readily mounted without paying particular attention to its relation to the floor.

In Figs. 3, 4, and 5 I have shown a trap in which the cup d is practically dispensed with, a passage d' taking the place of the cup, the passage i into the chamber or receiver g being below the termination of the partition f, the level of the water in this trap being on the line y and the lowest possible level being on the line x'. Thus water in this instance remains not only in the passages c and e, but also in the bottom of the receiver g. Under ordinary circumstances this trap cannot be siphoned, as the seal will be broken as soon as the water is drawn to the outlet b, the air escaping from the passage c through the passages e and j to the outlet b. This trap is scoured in the same manner as the trap shown in Fig. 1, the same action taking place.

In Fig. 6 I have illustrated a trap which may be used above the floor and connected to the waste-pipe a' of the sink or basin, the passage c forming a direct continuation of said pipe. Otherwise this trap is similar to the trap shown in Fig. 3.

In Fig. 7 I have shown the cleaning-opening for the trap in line with the passage e instead of in line with the passage c. This cleaning-opening may be provided with the adjustable cap shown when the trap is mounted under the floor or may be provided with an ordinary cap when the trap is exposed.

I claim as my invention—

1. The combination, in a waste-trap, with inlet and outlet passages, of the vertical passage c, forming a continuation of the inlet-passage, a cup d, passage e, a partition f, extending into said cup, with the receiver g between the passage e and the outlet-passage, and a partition h, separating the receiver from the passage e, whereby the waste water is directed to the dome and from thence to the receiver, substantially as specified.

2. The combination, in a trap, of the inlet and outlet openings and vertical passages c and e therein communicating at their bases with a receiver g between the passages and the waste, said receiver connected at its base with one of said passages, with a passage j, forming a communication between the passage e and the receiver at the upper end, the dome of said passage j being rounded, so as to direct the water which flows through the passage j down into the receiver before it passes away from the trap, substantially as described.

3. The combination, in a trap, of the inlet-passage a, a vertical passage c, forming a continuation of the inlet-passage, a vertical passage e, a partition f, separating said passages c and e, said passages being connected at their lower ends, a receiver g, a passage j, connecting said receiver with the passage e at the top, and a passage i, connecting the bottom of the receiver with the passage e, a lip k, separating the passage j and the outlet-passage b and acting to direct the water from said passage j into the receiver, substantially as described.

4. The combination, in a trap, of the inlets and outlets therefor, passages therein, and a cleaning-opening extending above the trap, an adjustable sleeve on said extension, and a cap for said sleeve, substantially as and for the purpose described.

5. The combination, in a trap, of the passages therein, a screw-threaded cleaning extension, a screw-threaded sleeve adapted to said extension, a follower adapted to the screw-threads of said sleeve, packing between the follower and upper edge of the extension, and a cap for said extension, substantially as and for the purpose set forth.

6. The combination, in a trap, of the inlet and outlet passages, vertical passage c, communicating with the said inlet-passage, the passage e, and receiver g, an extension forming a continuation of the passage c, a flanged sleeve adjustable on said extension, packing between the extension and sleeve, and a cap adapted to the said flanged sleeve, substantially as described.

In testimony whereof I have signed my name to this specification in the presence of two subscribing witnesses.

GEORGE F. BROWN.

Witnesses:
HARRY SMITH,
HENRY HOWSON.